United States Patent [19]

Lindenthal et al.

[11] Patent Number: 4,752,275
[45] Date of Patent: Jun. 21, 1988

[54] COUPLING WITH A HUB FOR TRANSMITTING A TORQUE ONTO A SHAFT

[75] Inventors: Hans Lindenthal; Peter Babik, both of Heidenheim, Fed. Rep. of Germany

[73] Assignee: J. M. Voith GmbH, Heidenheim, Fed. Rep. of Germany

[21] Appl. No.: 937,097

[22] Filed: Dec. 2, 1986

[30] Foreign Application Priority Data

Dec. 21, 1985 [DE] Fed. Rep. of Germany ....... 3545651

[51] Int. Cl.$^4$ ............................................... F16D 9/00
[52] U.S. Cl. .......................................... 464/32; 403/2; 403/5
[58] Field of Search ......................... 403/2, 5, 31, 36; 464/24, 30, 32, 33

[56] References Cited

U.S. PATENT DOCUMENTS

| 1,637,944 | 8/1927 | Keller | 464/33 |
|---|---|---|---|
| 2,680,359 | 6/1954 | Bowers | 464/33 |
| 4,040,338 | 8/1977 | Wilson et al. | 403/2 X |
| 4,264,229 | 4/1981 | Falk et al. | 403/5 |
| 4,452,095 | 6/1984 | Roy et al. | 464/32 X |

FOREIGN PATENT DOCUMENTS

| 2129310 | 2/1983 | Fed. Rep. of Germany . | |
| 732597 | 5/1980 | U.S.S.R. | 464/33 |

Primary Examiner—Daniel P. Stodola
Attorney, Agent, or Firm—Albert L. Jeffers

[57] ABSTRACT

A coupling for transmitting a torque from a shaft to a hub provided with an internal chamber which can be pressurized and which is relieved when a relative rotational movement takes place in relation to the shaft due to an overload and which is secured against slipping off from the shaft seat in an axial direction by a two-part flange mounted on the shaft. The flange engages with a radial groove in the hub in a claw-like manner and carries a shear-off device for breaking off the plug sealing the internal pressure chamber.

14 Claims, 1 Drawing Sheet

COUPLING WITH A HUB FOR TRANSMITTING A TORQUE ONTO A SHAFT

The present invention relates to a coupling with a hub for transmitting a torque onto a shaft, of the type having a cylindrical chamber arranged in the hub at a slight distance from the shaft and fillable with a pressurized medium, a passage in the hub communicating with the chamber and closed to atmosphere by a closure element, and a flange, rotationally fixed on the shaft, having means for opening the closure element in the event of a relative movement between the flange and the hub. Such couplings are known for instance from DE-OS No. 29.23 902.

If this type of coupling is used for applications where the hub frequently has to be pulled off the shaft, it may be advisable to give the shaft end a slightly conical shape in order to avoid wear and scoring of the contacting surfaces of shaft and hub as far as possible. Replaceable sleeves on the shaft end are also known to be used for this purpose.

The inventors have apprehended that once the plug has been sheared off the hub may creep axially in the direction towards the shaft end, this being possible especially when the drive is by a universal joint shaft with length compensation. Such creeping is undesirable since it may result in the hub moving beyond the shaft end and causing damage to adjacent equipment, especially in large machines such as rolling mills.

The invention is based on the object of making a coupling of the aforementioned kind being axially held after the plug has sheared off.

This object is reached by one aspect of our invention. The function of a coupling of the kind specified comprises a member which is torsionally rigidly connected to the shaft and which breaks the compression lock by relieving the pressurized chamber inside the hub of pressure when a permissible torque is exceeded and a relative rotation in relation to the hub breaking off the plug takes place. According to our invention, this member, which is basically known, takes the form of a flange torsionally rigidly connected with the shaft and assumes a further function in addition to shearing off the plug. It is designed in two parts, surrounds the shaft and is axially locked in an annular radial groove in the shaft by a radial collar. Furthermore, the flange extends into the hub area where it is formed with a collar-like claw engaging a corresponding annular radial groove in the hub. It is only at this claw of the flange that the shear-off device for the plug relieving the internal pressure chamber when the hub breaks off in the case of an overload is located. This arrangement does not prevent a relative movement of the hub on the shaft end, but it prevents the hub from axially slipping off by mutually interlocking with the flange.

Other aspects of the preferred embodiment reach further objects of the invention. It has proven advantageous to transversely split the flange at the centre and to attach the two flange halves to the hub and guide them radially in such a way that, when removing the flange from the shaft together with the hub, the axial safety lock is disengaged while the flange halves still remain engaged with the radial groove in the hub through the claw. The hub thus forms one complete assembly together with the two flange halves, whereby no part must be totally disconnected or can get lost. During operation, the two flange halves are clamped together onto the shaft, e.g. by means of bolts. For totally removing the hub from the shaft end, the bolted connection of the flange halves on the shaft has to be released. The flange halves at the hub can then be radially separated from each other until the axial lock on the shaft is open and the hub can be axially shifted. In assembled condition, the flange can be used as a reference basis for assembly and alignment.

It is furthermore preferable to provide an axial clearance for the claw on the flange and the radial groove in the hub so that a slight lift-off from the conical shaft seat is possible when the hub is released due to an overload. This would protect the seating surfaces of both parts. According to a further aspect of the invention, the shear-off device for the plug fitted to the claw connected to the flange is designed as a plug screw able to receive the broken part of the plug itself and protecting the plug from external influences.

The invention will now be described by way of example with reference to the accompanying drawing wherein.

Figure 1:
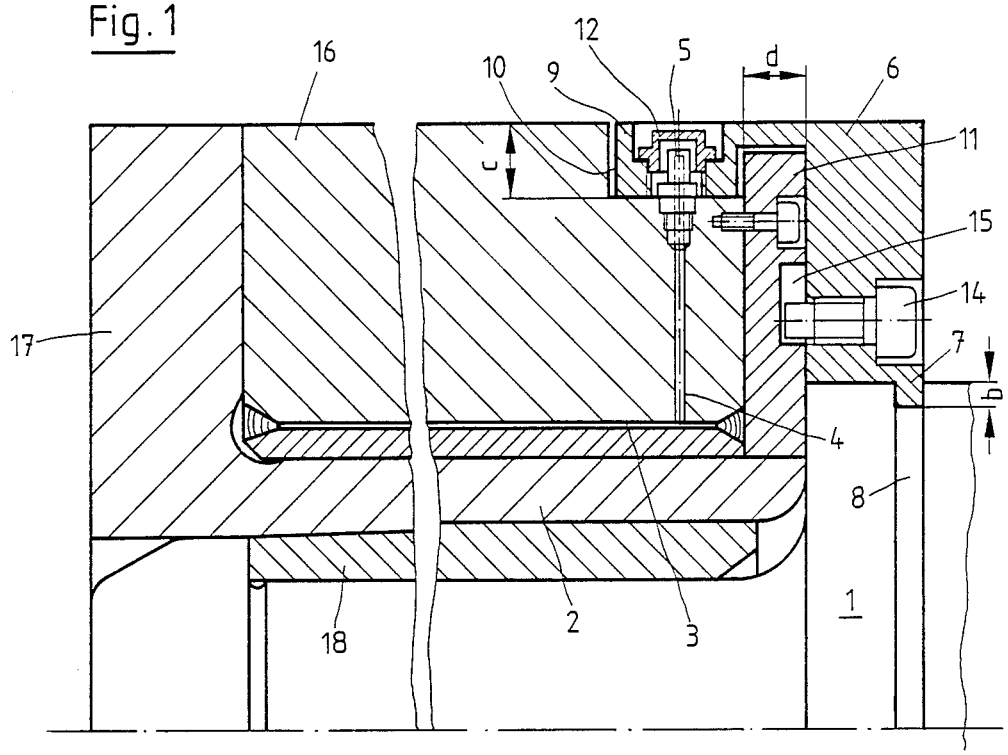
FIG. 1 is a longitudinal sectional view of the coupling.

In both Figures, like reference characters designate like parts. The coupling shown in FIG. 1 comprises a hub 2 surrounding a shaft 1, whereby a torque is to be transmitted between these two parts. In the hub, a cylindrical chamber 3 is provided at a location near the shaft in a way known. This chamber is connected with a passage 4 whose opening to the atmosphere is closed with a plug 5.

A flange 6 is torsionally rigidly arranged on the shaft 1. This flange is of split design, both halves being clamped together by means of bolts 13. In addition to this friction lock, a positive axial safety lock is provided by means of a collar 7 on flange 6 and a corresponding annular groove 8 in shaft 1. Flange 6 and hub 2 are axially tied together by a claw 9 designed as a collar extending radially inwards. Being a part of flange 6, this claw protrudes into the space of hub 2 and engages with an annular radial groove 10 on the periphery of hub 2. This radial groove 10 may be limited by a detachable plate 11 fitted to the end face of hub 2.

In this radial groove 10 there is situated the plug 5 for chamber 3 inside the hub, whereby the plug 5 is provided with a predetermined breaking point. The claw 9 has a shearing-off device in the form of a plug screw 12 which surrounds the breakable portion of plug 5, protects the plug from unintentional damage, and receives the part broken off in the case of an overload. Upon removal of the plug screw 12, a new plug 5 can be fitted and chamber 3 can be pressurized again.

Figure 2:
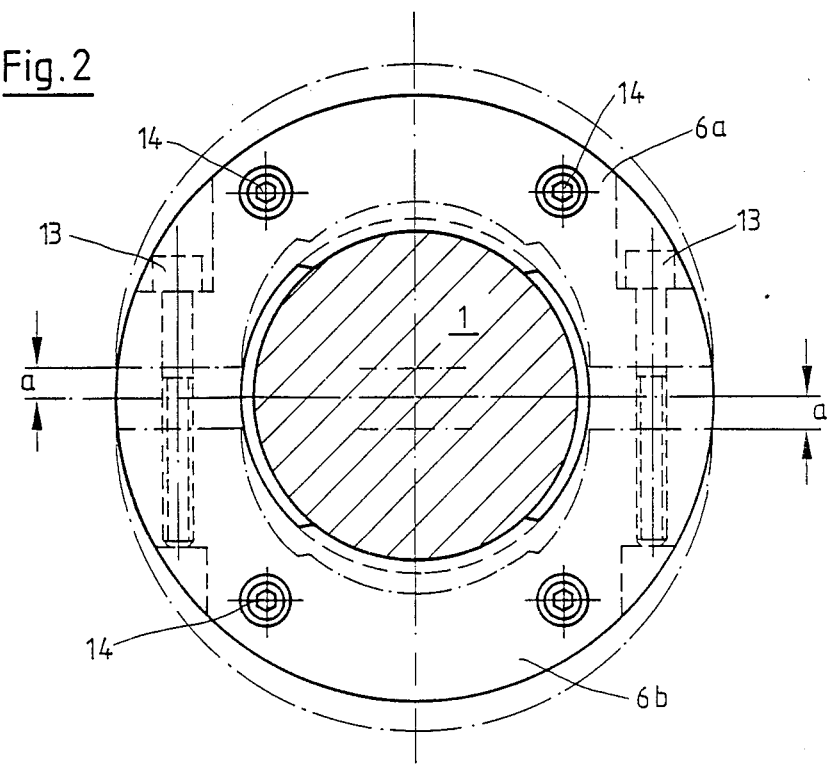
FIG. 2 is a view of the corresponding flange as viewed in an axial direction.

The two halves 6a and 6b of flange 6 are held together by means of bolts 13 as shown in FIG. 2. For dismantling, bolts 13 can be removed and the two halves of the flange separated from one another to a degree such that the collar 7 comes out of the radial groove 8 in the shaft. It will be noted that the collar 7 on each flange half may also extend only to a part of the circumference, thus reducing dimension b. The radial extension of collar 9 on the flange 6, i.e. dimension c, is greater than dimension a. Furthermore, flange 6 is provided with retaining bolts 14 projecting into recesses forming an annular groove 15 in the end face of hub 2 and serving as radial stops for the flange halves 6a and 6b when pulled apart.

In the present example, hub 2 consists of two parts, namely an outer part called supporting hub 16, which comprises the enclosed chamber 3 to which pressure can be applied, and an inner part 17 forming a part of a universal joint shaft, which is pressed against the conical shaft seat under the tension of supporting hub 16. The mating seat on shaft 1 is provided by an exchangeable sleeve 18. Thus, the parts exposed to possible wear are replaceable, especially in drivelines where frequent dismounting or tripping is anticipated. Damage to the seats can furthermore be prevented by making dimension d at the end of the hub smaller than the width of the corresponding groove in flange 6 so that upon release the hub can separate from the shaft seat by a slight axial displacement.

What is claimed is:

1. Coupling with a hub for transmitting a torque to a shaft, with a cylindrical chamber arranged in the hub at a slight distance from the shaft and fillable with a pressurized medium, with a passage in the hub communicating with the chamber and closed to atmosphere by a closure element, and with a flange, rotationally fixed on the shaft, having means for opening the passage in the event of a relative movement between the flange and the hub, the improvement in combination therewith comprising:
   (a) said hub (2) defining an annular radial groove (10);
   (b) said flange (6) detachably mounted on the shaft (1) and split and two halves (6a, 6b) in a cutting plane extending through the longitudinal axis of the shaft (1);
   (c) said opening means including a claw (9) supported by said flange which extends axially of the shaft (1) and radially inwardly in engagement with the annular radial groove (10) and said closure element (5), the claw further including a recess and the closure element being so arranged as to protrude into the recess of the claw, whereby relative movement between the hub and the shaft causes the closure element to break off to open the passage.

2. Coupling according to claim 1, in which said flange (6) engages an end face of the hub (2) and is aligned radially with the shaft (1).

3. Coupling according to claim 2, in which for the radial alignment of the flange halves (6a, 6b), said hub (2) defines a recess (15), and the flange halves (6a, 6b) are provided with retaining bolts (14) which seat in the recess (15).

4. Coupling according to claim 3, in which an end face of the hub (2) includes a plate (11) that forms a flank of the annular radial groove (10) of the hub (2) and which defines the recess (15) for the retaining bolts (14).

5. Coupling according to claim 1, in which an end face of the hub (2) includes a plate (11) that forms a flank of the annular radial groove (10) of the hub (2) and which defines the recess (15) for the retaining bolts (14).

6. Coupling according to claim 1, in which the shaft (1) defines an annular groove (8), and flange (6) features an inside collar (7) which engages the annular groove (8) in the shaft (1).

7. Coupling according to claim 6, in which the inside collar (7) on the flange (6) extends around only part of the inside circumference of the flange (6).

8. Coupling according to claim 7, in which each flange half (6a, 6b) is radially shiftable relative to the shaft (1) and has a radial distance of shift (a) which is greater than the radial expanse (b) of the inside collar (7) on the flange (6), the radial distance of shift (a) being limited by the retaining bolts (14) in cooperation with the recess (15).

9. Coupling according to claim 1, in which each flanges half (6a, 6b) is radially shiftable relative to said shaft and has a radial distance of shift (a), and the engagement (c) of the claw (9) into the radial groove (10) in the hub (2) extends to a depth greater than the radial distance of shift (a) of each flange half (6a, 6b).

10. Coupling according to claim 1, in which the closure element is fashioned as a stopper (5) which can be sheared off, said means for opening the closure element including a shearing device (12), said shearing device (12) fashioned as a screw which is insertable radially into the claw (9) from outside and which defines the recess of the claw (9) into which the stopper (5) protrudes.

11. Coupling according to claim 1, in which the flange (6) and the hub (2) have the same outside diameter.

12. Coupling according to claim 1, in which the claw (9) and the annular radial groove (10) are sized to permit axial play of the claw (9) on the hub (2).

13. Coupling according to claim 1, in which there is arranged on the shaft (1) a component which is configured as a universal joint shaft having flange (17) and a cylindrical shaft which envelopes the shaft (1) and which is enveloped by the hub (2).

14. Coupling according to claim 13, in which the hub (2) is an integral assembly with the universal joint shaft flange (17).

* * * * *